(12) United States Patent
Parry et al.

(10) Patent No.: US 10,858,994 B2
(45) Date of Patent: Dec. 8, 2020

(54) GAS TURBINE FLOW SPLITTER HAVING NOISE ATTENUATION BOREHOLES

(71) Applicant: ROLLS-ROYCE plc, London (GB)

(72) Inventors: Anthony B. Parry, Derby (GB); Nicholas D. Humphreys, Derby (GB)

(73) Assignee: ROLLS-ROYCE plc, London (GB)

(*) Notice: Subject to any disclaimer, the term of this patent is extended or adjusted under 35 U.S.C. 154(b) by 271 days.

(21) Appl. No.: 15/948,205

(22) Filed: Apr. 9, 2018

(65) Prior Publication Data

US 2018/0291808 A1 Oct. 11, 2018

(30) Foreign Application Priority Data

Apr. 10, 2017 (GB) .................................. 1705734.0

(51) Int. Cl.
*F02C 7/045* (2006.01)
*F02K 1/82* (2006.01)
*F02K 3/06* (2006.01)

(52) U.S. Cl.
CPC .............. *F02C 7/045* (2013.01); *F02K 1/827* (2013.01); *F02K 3/06* (2013.01)

(58) Field of Classification Search
CPC ... F02K 3/06; F02K 1/827; B64D 2033/0206; F02C 7/045; F05D 2260/963; F05D 2260/96; F05D 2220/323
See application file for complete search history.

(56) References Cited

U.S. PATENT DOCUMENTS

| 4,371,132 A | * | 2/1983 | Woodward ................ F02K 1/72 244/110 B |
| 2003/0035719 A1 | * | 2/2003 | Wadia ..................... F02C 7/047 415/145 |
| 2007/0012508 A1 | * | 1/2007 | Demers ................ G10K 11/168 181/210 |
| 2008/0216300 A1 | * | 9/2008 | Anderson ................. F02K 3/06 29/402.07 |
| 2012/0085861 A1 | | 4/2012 | Mardjono et al. |
| 2016/0108754 A1 | * | 4/2016 | Herbaut ............... H05H 1/2406 415/121.3 |
| 2016/0230993 A1 | * | 8/2016 | Dai ......................... F01D 5/186 |
| 2017/0001730 A1 | * | 1/2017 | Namgoong ............ B64D 29/00 |
| 2017/0003026 A1 | * | 1/2017 | Holdcraft ................ F23R 3/002 |
| 2017/0321604 A1 | * | 11/2017 | Lourit ...................... F02K 3/06 |
| 2018/0112596 A1 | * | 4/2018 | Vriendt ................... F01D 25/02 |
| 2019/0024533 A1 | * | 1/2019 | Scholtes ............... F01D 25/246 |
| 2020/0149411 A1 | * | 5/2020 | Propheter-Hinckley ..................... F01D 5/141 |

FOREIGN PATENT DOCUMENTS

| EP | 1801389 | 6/2007 |
| EP | 2932068 | 10/2015 |
| EP | 3112269 | 1/2017 |
| WO | 0244539 | 6/2002 |

OTHER PUBLICATIONS

Great Britain Search Report dated Oct. 9, 2017, issued in Great Britain Patent Application No. 1705734.0.

* cited by examiner

*Primary Examiner* — William H Rodriguez
(74) *Attorney, Agent, or Firm* — Oliff PLC

(57) ABSTRACT

A flow splitter for a gas turbine engine comprising one or more boreholes formed in an exterior surface of the flow splitter. A gas turbine engine comprising a flow splitter.

14 Claims, 6 Drawing Sheets

GAS TURBINE FLOW SPLITTER HAVING NOISE ATTENUATION BOREHOLES

CROSS-REFERENCE TO RELATED APPLICATIONS

This specification is based upon and claims the benefit of priority from UK Patent Application Number 1705734.0 filed on 10 Apr. 2017, the entire contents of which are incorporated herein by reference.

BACKGROUND

1. Field of the Disclosure

The present disclosure concerns a flow splitter for a gas turbine engine.

2. Description of the Related Art

There are many noise sources in modern gas turbine engines. In particular, noise is produced in a gas turbine engine as the airflow interacts with the engine section stator (ESS). This ESS interaction tone noise can escape around the flow splitter and down the bypass duct, typically by reflection off the fan blades, or by diffraction round the splitter. This ESS interaction noise can then escape from the engine down the bypass duct and adds to the overall level of noise produced by the engine.

It is generally desirable to reduce the overall level of noise which is produced by a gas turbine engine for reasons such as reducing noise pollution. Therefore, it will be understood that it would be desirable to reduce specific sources of noise within the engine, such as the ESS interaction tone escaping down the bypass duct.

SUMMARY

According to a first aspect there is provided a gas turbine engine comprising:
  a fan;
  an engine core located downstream of the fan so as to receive a first portion of flow from the fan;
  a bypass duct located downstream of the fan and radially outside the engine core, so as to receive a second portion of flow from the fan; and
  a flow splitter defining the location at which the flow from the fan splits into the first and second portions, wherein:
the flow splitter comprises one or more noise-attenuation boreholes formed in an exterior surface of the flow splitter.

The flow splitter may be referred to herein simply as a "splitter" for brevity.

The boreholes may be for acoustic attenuation of noise, and in particular, noise in or arising from the gas turbine engine.

One or more of the boreholes may be open or unblocked during use. The boreholes may be free of any fixing device, such as bolts or rivets.

One or more of the boreholes may be cylindrical boreholes. One or more of the boreholes may be prismatic along their depth. The depth of a borehole may be a distance measured along the borehole from its opening on the exterior surface to an end of the borehole ultimate its opening.

One or more of the boreholes may be arranged as Helmholtz resonators. One or more of the boreholes may have a first section proximate the exterior surface having a first diameter or cross-sectional area, and a second section ultimate the exterior surface having a second diameter or cross sectional area larger than the first diameter or cross-sectional area. The second section first section may be a neck and the second section may be a resonator cavity. One or more of the boreholes may comprise an abrupt or step increase in cross-sectional area or diameter between the first section and the second section. The first and second sections of the borehole may be in communication with each other.

One or more of the boreholes may be elongate, may extend into a body of the flow splitter, and may form an opening on the exterior surface.

A length or depth of one or more of the boreholes may be between around three to ten times a diameter of the borehole.

One or more of the boreholes may have a constant diameter or cross-sectional area along their depth or length. One or more of the boreholes may have a tapering or increasing diameter along a depth or length of the borehole.

One or more of the boreholes may have a diameter of less than 2 mm, less than 1 mm, less than 0.5 mm, less than 0.2 mm, or less than 0.1 mm. One or more of the boreholes may have a diameter between 0.1-1 mm or 0.1-0.2 mm.

One or more connecting passages may be formed between one or more of the boreholes. One or more of the connecting passages may connect one part of a borehole to another part of the same borehole. One or more of the connecting passages may be formed between two or more of the boreholes. One or more of the connecting passages may form a flow passage between two or more boreholes.

One or more of the boreholes may be substantially linear, arcuate, curved, or serpentine.

The flow splitter may comprise an internal cavity. One or more of the boreholes may extend from the external surface and open into the internal cavity to form a passage between an exterior of the flow splitter and the internal cavity. The flow splitter may have a hollow interior which forms the internal cavity.

Multiple boreholes may open into the same internal cavity. The flow splitter may comprise a plurality of internal cavities, and one or more boreholes may open into each internal cavity.

One or more of the boreholes may be configured or angled relative to the external surface to avoid blockage of the boreholes. One or more of the boreholes may extend into the exterior surface of the flow splitter at an oblique angle to the direction of air flow over the flow splitter or to the axial direction of the engine. One or more of the boreholes may be arranged away from the leading edge of the flow splitter to minimise blockage of the boreholes by particular matter in the air flow over the splitter.

The flow splitter may comprise a support structure and a liner mounted on the support structure which forms the exterior surface of the splitter, wherein the one or more boreholes are formed in the liner.

The liner may be removably mounted on the support structure. The liner may conform to a shape of the support structure.

The flow splitter may comprise a leading edge delineating two surfaces and the one or more boreholes may be formed in a region of the flow splitter extending around the leading edge from one surface to the other.

The one or more boreholes may be empty or free of fixings in an installed configuration of the flow splitter.

In a second aspect, there is provided gas turbine engine comprising a flow splitter as hereinbefore described.

An aft end of the flow splitter may be mounted to a support of the gas turbine engine by one or more fasteners.

The one or more boreholes may be separated from each and every fastener and empty of any fastener.

The bypass duct and the engine core may be separated by a casing (which may be referred to as an inner casing, for example to differentiate it from a fan casing which may be referred to as an outer casing), which may be a substantially annular casing. The flow splitter may be provided at the leading edge of such a casing.

The engine core may comprise at least one of a compressor, a combustor, and a one turbine.

The skilled person will appreciate that except where mutually exclusive, a feature described in relation to any one of the above aspects may be applied mutatis mutandis to any other aspect. Furthermore except where mutually exclusive, any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
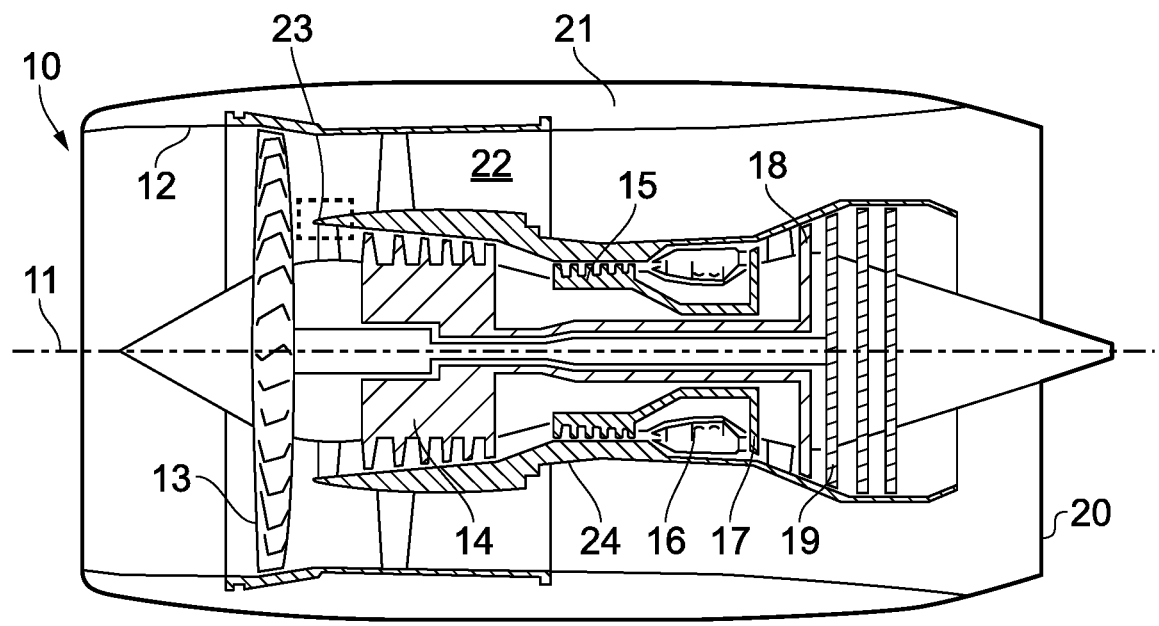
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 past a flow splitter 23, which splits the air into two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

A generally tubular (or annular) inner casing 24 of the engine houses the compressors 14, 15, the combustion equipment 16, and the turbines 17, 18, 19. The inner casing 24 is arranged radially inwards of the nacelle 21. The annular gap between the nacelle 21 and the inner casing 24 forms the bypass duct 22.

The flow splitter 23 (which may be referred to simply as a "splitter" for brevity) is arranged at the leading edge of the inner casing 24 immediately downstream of the fan 13. The inner casing 24, and thus the flow splitter 23, extends around the entire circumference of the engine 10 within the nacelle 21 and divides the air flow from the fan 13 into two air flows which are separated by the inner casing 24. The air flow passing radially inwards of the flow splitter 23 enters the compressor 14, is compressed, and passes through the other engine components to produce thrust as discussed above. This air flow radially inside the inner casing 24 will be referred to as the 'core' airflow.

The air flow which passes radially outwards of the flow splitter 23 and the inner casing 24 passes through the annular bypass duct 22. This air flow will be referred to as the 'bypass' air flow.

Air flow from the fan 13 which has not travelled downstream past the splitter 23 will be referred to as the 'combined' airflow.

In order to split the combined air flow efficiently and reduce any negative aerodynamic effects, the flow splitter 23 is a tapered leading edge of the inner casing 24. In some cases, the flow splitter 23 can be integrally formed with the rest of the inner casing 24, and in other cases, it may be an auxiliary component which is connected to the upstream end of the inner casing 24. Where the flow splitter 23 is a separate component attached to the inner casing 24, it may be connected with bolts, rivets, or the like to enable replacement of the flow splitter 23 if it becomes damaged or faulty during use.

Figure 2:
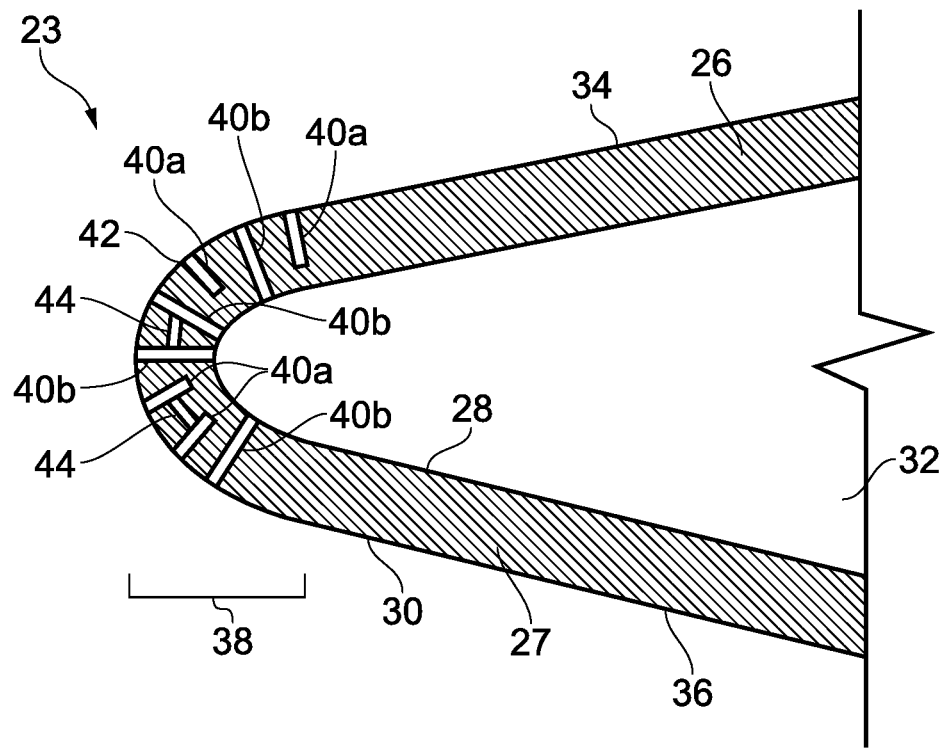
FIG. 2 is a detailed sectional side view of a first embodiment of a flow splitter according to the present disclosure.

One embodiment of the flow splitter 23 is shown in more detail in FIG. 2.

FIG. 2 shows the portion of the engine within the dotted boundary in FIG. 1. As will be understood, FIG. 2 therefore shows a portion of the flow splitter 23 in cross-section along a radius of the engine 10.

The flow splitter 23 comprises a body 26 in the form of skin 27. The skin 27 forms the tapered shape of the splitter 23 and is supported by a frame (not shown). The skin 27 of the splitter 23, and thus the splitter 23 itself, has an internal surface 28 and an external surface 30. As the flow splitter 23 is formed by the skin 27, the splitter 23 is substantially hollow and defines an internal cavity 32 which is surrounded by the skin 27.

The external surface 30 of the splitter 23 comprises two substantially opposing surfaces 34, 36. The radially outer surface 34 will be referred to as bypass surface 34 as it faces the bypass air flow, and the radially inner surface 36 will be referred to as core surface 36 as it faces the core air flow. A leading edge region 38 of the splitter 23 extends around the leading edge of the splitter 23 between the bypass and core surfaces 34, 36, which diverge as they extend downstream. The flow splitter 23 therefore has a minimum radial width at the leading edge section 38, and gradually increases in radial width as it extends downstream.

A plurality of boreholes 40 are formed in the exterior surface 30 of the flow splitter 23. The boreholes 40 provide acoustic attenuation of noise within the engine from various sources. The boreholes 40 are relatively small tubular bores which are formed in a pattern about the leading edge section 38 of the splitter 23. The boreholes 40 may form a borehole array which extends about the entire circumference of the flow splitter 23 around the engine 10. In other examples, the boreholes 40 may be formed in only certain locations of the flow splitter 23 about the engine 10.

The boreholes 40 are elongate and extend into the body 26 of the flow splitter 23 from the exterior surface 30. The boreholes each form an opening 42 on the exterior surface 30 and extend into the skin 27 by a depth.

Some of the boreholes 40a extend into the skin 27 by a depth which is less than a thickness of the skin 27, such that the boreholes 40a do not reach the internal cavity 32 of the splitter 23. These boreholes 40a may be referred to as 'capped' boreholes 40a.

Other boreholes 40b have a depth equal to the thickness of the skin 27 such that they extend from the external surface 30 through the skin 27 and open into the internal cavity 32. These boreholes 40b thus form a passage or conduit between the exterior of the flow splitter 23 and its internal cavity 32. These boreholes 40b may be referred to as 'through' boreholes 40b. Of course, in some cases, the flow splitter 23 may not comprise an internal cavity 32, in which case there will be no through boreholes 40b. Where through boreholes 40b are provided, the internal cavity 32 may be used as a resonance damping chamber by utilising Helmholtz resonance.

In some examples, all of the boreholes 40 may be either capped boreholes 40a, or through boreholes 40b. In other examples, like that shown in FIG. 2, there may be a mixture of capped and through boreholes 40a, 40b. Boreholes 40 of the same type (i.e. capped or through) may not all have the same depth or length. For example, capped boreholes 40a may have different depths into the skin 27, or may have substantially identical depths into the skin 27.

In some examples, like splitter 23 of FIG. 2, one or more connecting passages 44 may be formed between the boreholes. The connecting passages 44 may connect boreholes of the same type (i.e. only capped boreholes, or only through boreholes), or may connect boreholes 40 of different types. Connecting passages 44 may, in some examples, connect one part of a borehole 40 to another part of the same borehole 40. Connecting passages 44 may also extend to connect more than two boreholes 40 together, or may be in communication with the exterior of the splitter 23, or the internal cavity of the splitter 23.

Figure 5:
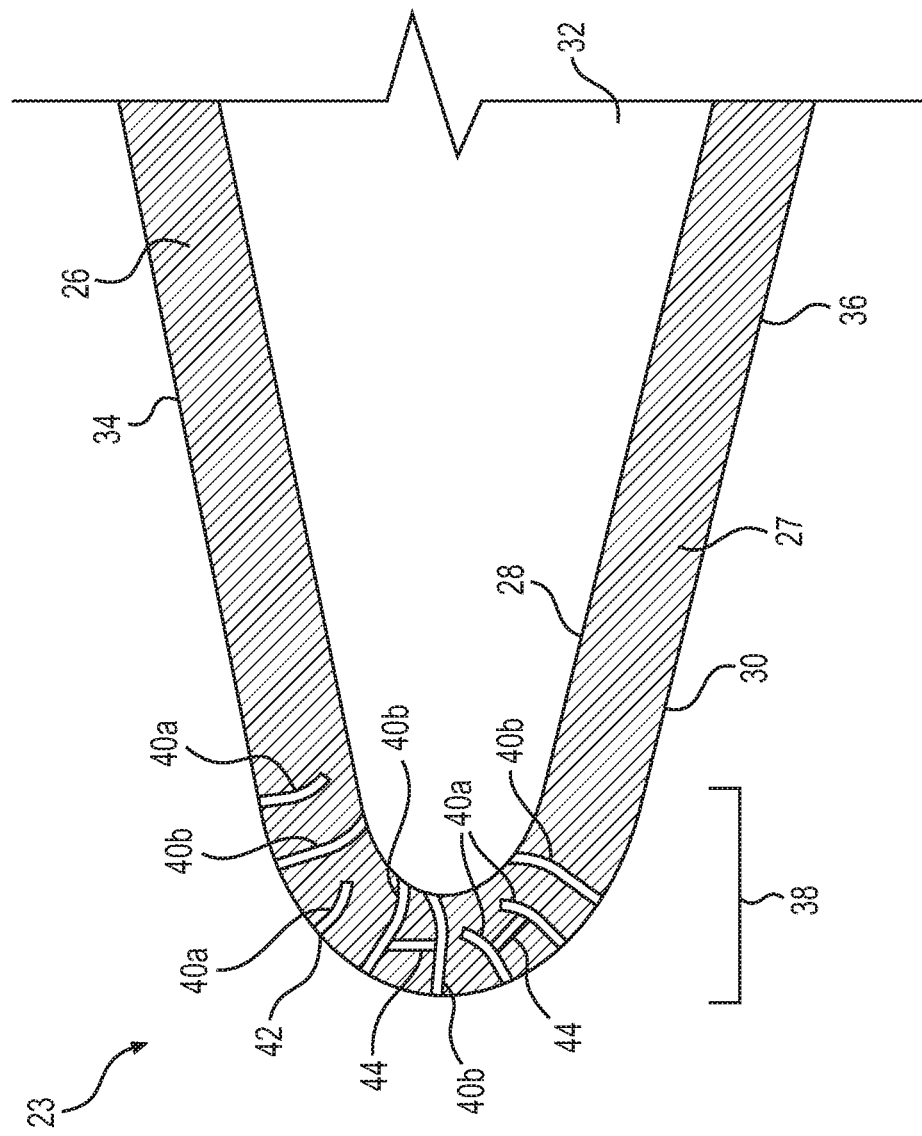
FIGS. 5-7 are detailed sectional side views of a modification of the first embodiment of a flow splitter according to the present disclosure.
Figure 6:
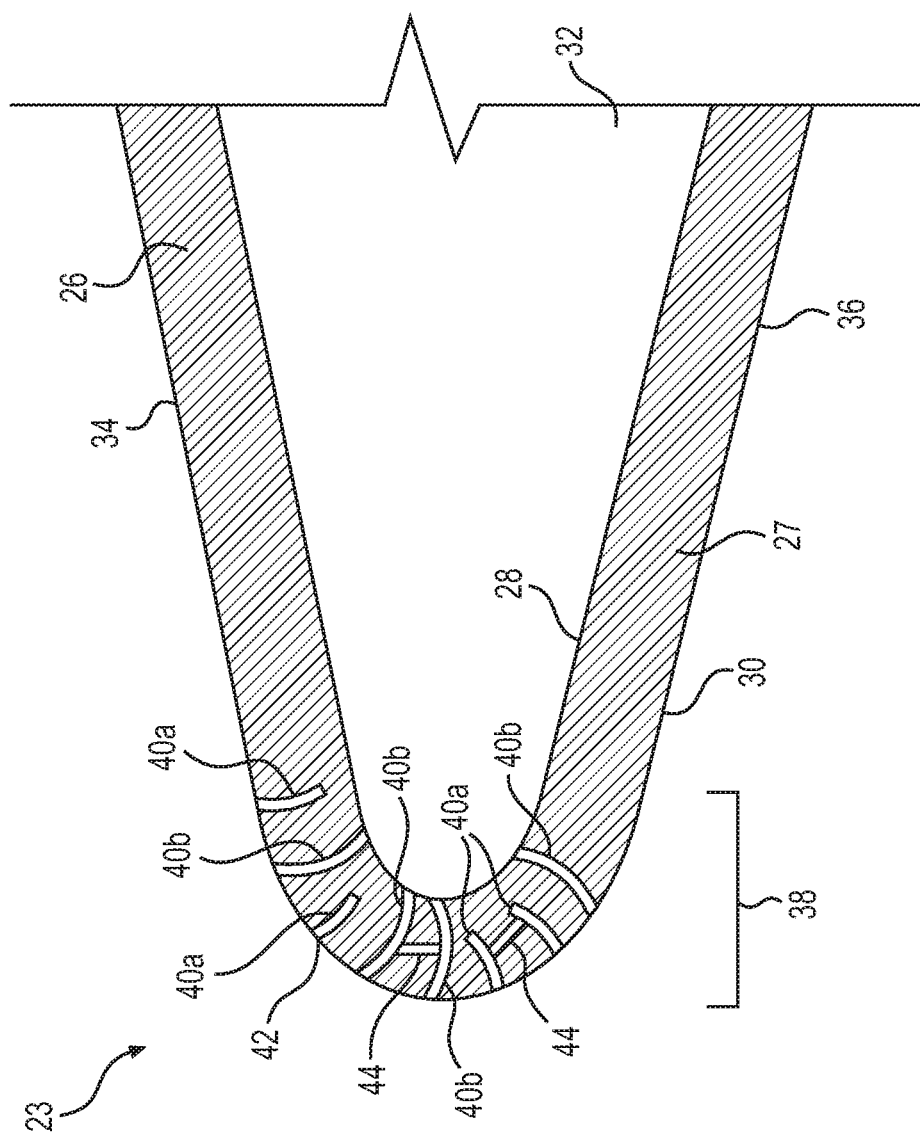
Figure 7:
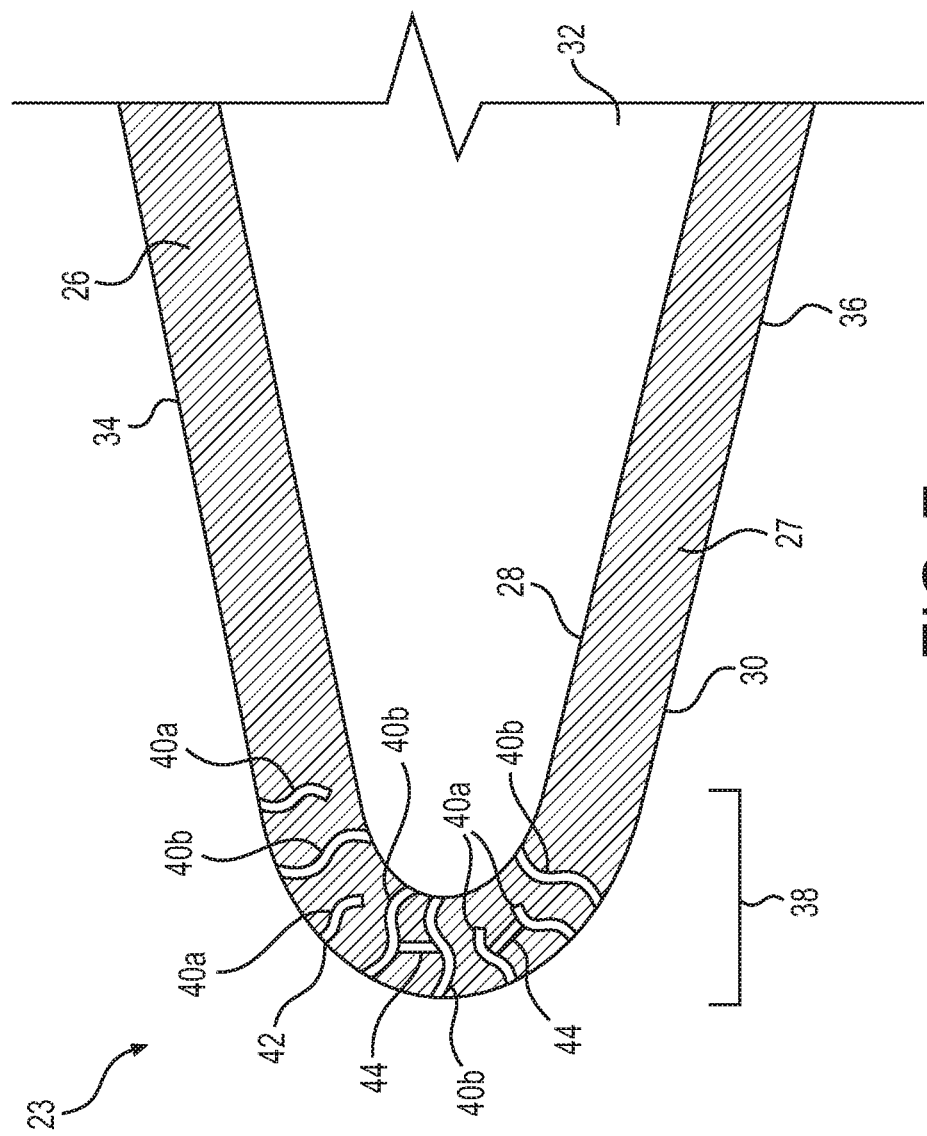

In FIG. 2, all of the boreholes 40 are linear boreholes which have a cylindrical shape (i.e. a circular cross sectional area). In other examples, the boreholes 40 may take arched, curved, or serpentine paths (see FIGS. 5-7) through the body of the splitter. The boreholes 40 may have shapes other than cylindrical, such as an ovoid or cuboidal cross sectional area. The boreholes 40 may be prismatic along their depth or length, like those of FIG. 2, or may have a varying cross-section along their length.

In general, it should be understood that the boreholes can take many forms and that different types of boreholes may be combined in the same splitter. Furthermore, it should also be understood that the number, positioning, and type of the boreholes can be optimised for the particular application and the particular noise to be attenuated. For example, in some situations, it may be advantageous to have particular number of linear through boreholes 40b. In other examples, it may be advantageous to have a particular mixture of capped and through boreholes 40a, 40b having curved shapes and connecting passages 44.

In some examples, boreholes similar to boreholes 40 may also be formed outside of the leading edge section 38. For example, boreholes might also be formed in the bypass or core surfaces 34, 36.

Figure 3:
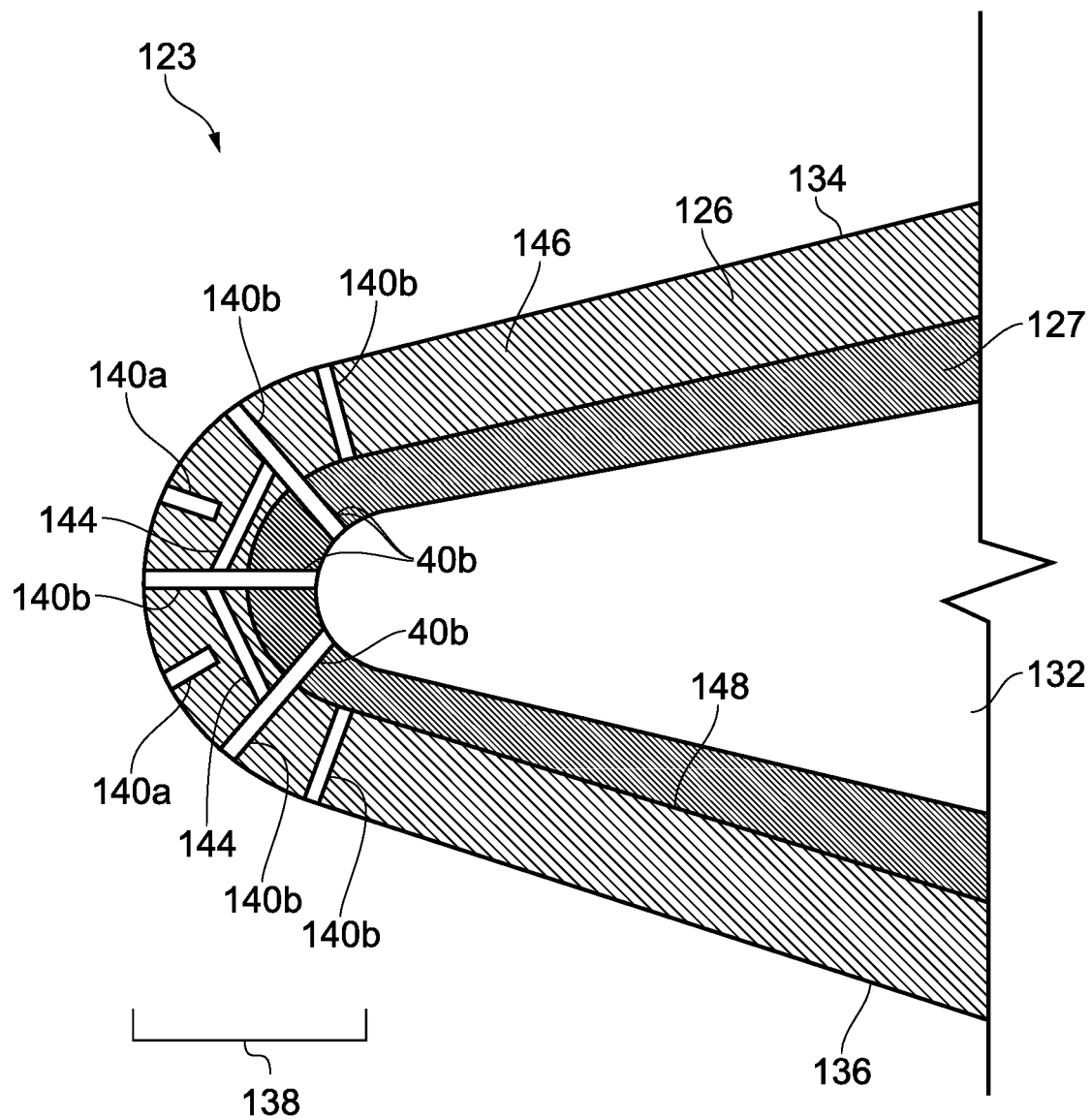
FIG. 3 is a detailed sectional side view of a second embodiment of a flow splitter according to the present disclosure.

A second embodiment of a flow splitter 123 is shown in FIG. 3. FIG. 3 shows the same view as FIG. 2. Like features between these figures are indicated by reference numerals which are spaced apart by 100.

The flow splitter 123 differs from the flow splitter 23 in that it comprises a liner 146 which is mounted on a support structure. In FIG. 3, the support structure is the skin 127 of the splitter 123. In other examples, the liner 146 may be simply supported by a support structure in the form of a frame structure (not shown). In this latter case, the liner 146 may be similar to the skin 27 of splitter 23, but may simply be readily removable from a supporting frame structure. Generally, the liner 146 is secured to the support structure by releasable securing means such that it can be removed and replaced.

The liner 146 forms part of the body 126 of the splitter 123 and also forms the exterior surface 130 of the splitter 123. An internal surface 148 of the liner 146 therefore conforms to the external surface of the skin 127.

In splitter 123, the boreholes 140 are formed in the liner 146 and extend into the liner 146 from the exterior surface 130. As with the boreholes 40, the boreholes 140 may have different types. Some boreholes 140a may extend into the liner 146 to a depth less than the thickness of the liner 146, these will be referred to as 'capped' boreholes 140a. Other boreholes 140b may extend though the entire thickness of the liner 146, which will be known as 'through' boreholes 140b. The boreholes 140 may have various forms as discussed above in relation to the boreholes 40 of splitter 23.

As shown in FIG. 3, in some examples, the skin 127 may also comprise boreholes 40b of the type discussed in relation to FIG. 2 above. Some of the boreholes 140b may align with the boreholes 40b to provide combine borehole which extends from the exterior surface 130 of the liner 146 through to the internal cavity 132. As shown in FIG. 3, not all of the boreholes 140b must have a corresponding aligned borehole 40b but, in some cases, each borehole 140b of the liner 146 will be aligned with a corresponding borehole 40b in the skin 127.

Connecting passages 144 may be formed between the boreholes 140 of the liner 146 in the same manner as connecting passages 44 of splitter 23.

Figure 4:
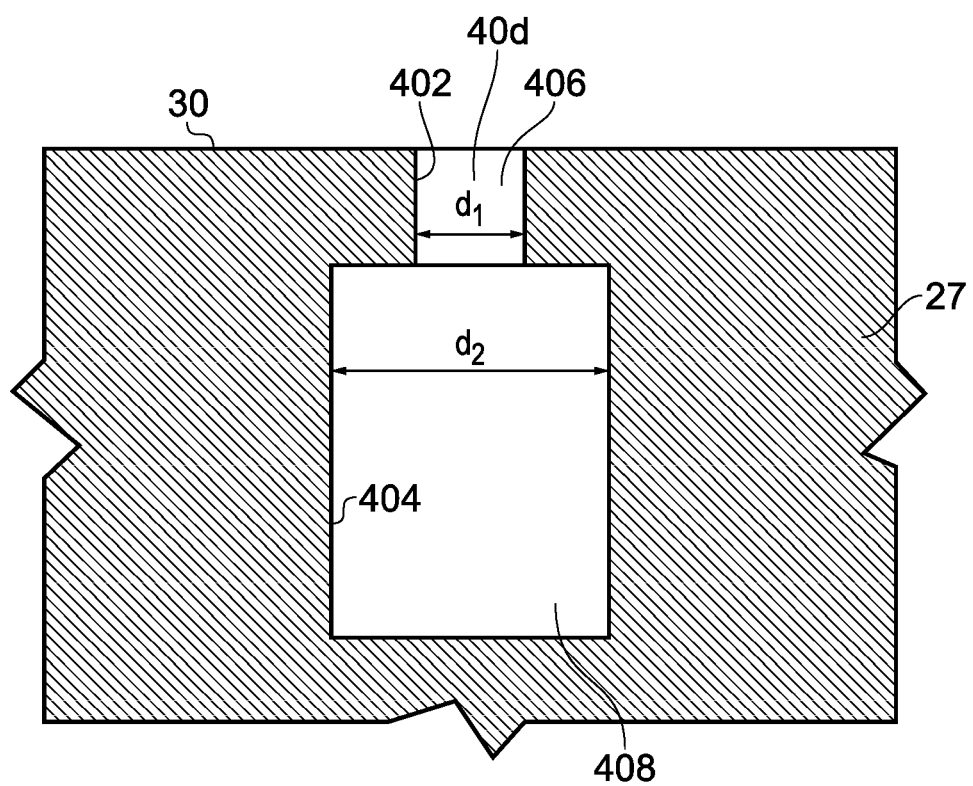
FIG. 4 is a detailed view of an alternative borehole according to the present disclosure.

FIG. 4 shows a detailed view of an alternative borehole 40d formed in the exterior surface 30 of the skin 27. The borehole 40d operates as a self-contained Helmholtz resonator. The borehole 40d comprises two sections having a shared central axis. The first cylindrical section 402 is proximate and extends into the exterior surface 30 of the skin and has a first diameter d1. The second cylindrical section 404 is in communication with the first section 402 and ultimate the exterior surface 30. Second section 404 has a second diameter d2 which is larger than the first diameter d1. The first section 402 therefore forms a neck 406, and the second section 404 forms a resonator cavity 408. The resonator cavity 408 is in communication with the exterior of the flow splitter via the neck 406. In the borehole 40d, there is a step change in the diameter of the borehole 40d between the neck 406 and the resonator cavity 408.

It will be understood that a gradual, abrupt, or chamfered transition section may be provided between the neck 406 and the cavity 408, while still maintaining the borehole 40d's function as a Helmholtz resonator. The neck and resonator cavity may have shapes other than those of FIG. 4. For example, the resonator cavity 408 could be spherical, or could have a hexagonal prismatic shape to tessellate with other resonator cavities 408 of other boreholes 40d also having the same shape. Boreholes of the type shown in FIG. 4 could also be utilised with other borehole types described herein, and with a liner 146 as shown in FIG. 3.

It will be understood that the boreholes of the embodiments disclosed herein act to attenuate acoustic waves which interact with the flow splitters 23, 123. Both of the splitters 23, 123 can be included in gas turbine engines in order to attenuate ESS interaction tone noise which is reflected off the fan blades or diffracted around the flow splitter. Of course, the flow splitters 23, 123 are also able to attenuate noise from other sources within the engine which interacts with the flow splitter, such as fan noise or reflected or diffracted outlet guide vane interaction tone noise.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine comprising:
    a fan;
    an engine core located downstream of the fan so as to receive a first portion of flow from the fan;
    a bypass duct located downstream of the fan and radially outside the engine core so as to receive a second portion of flow from the fan; and
    a flow splitter defining the location at which the flow from the fan splits into the first and second portions, wherein:
    the flow splitter comprises a body having an external surface, and an internal cavity, the external surface comprising two surfaces, the flow splitter having a leading edge that is delineated by the two surfaces, and one or more noise-attenuation boreholes formed in the exterior surface in a region extending around the leading edge open into the internal cavity,
    the leading edge is a curved surface that is formed between the two surfaces, and the one or more noise-attenuation boreholes are formed in the curved surface, and
    the two surfaces include a radially inner surface and a radially outer surface.

2. The gas turbine engine of claim 1, wherein the boreholes are cylindrical boreholes.

3. The gas turbine engine of claim 1, wherein a length of one or more of the boreholes is between around three to ten times a diameter of the borehole.

4. The gas turbine engine of claim 1, wherein one or more of the boreholes have a diameter of 0.1-1 mm.

5. The gas turbine engine of claim 1, wherein a connecting passage is formed between two or more of the boreholes.

6. The gas turbine engine of claim 1, wherein one or more of the boreholes are substantially linear.

7. The gas turbine engine of claim 1, wherein one or more of the boreholes are arcuate, curved, or serpentine.

8. The gas turbine engine of claim 1, wherein one or more of the boreholes comprises a first section proximate the exterior surface having a first cross-sectional area, and a second section ultimate the exterior surface having a second cross-sectional area larger than the first cross-sectional area.

9. The gas turbine engine of claim 8, wherein the one or more boreholes comprises an abrupt or step change in cross-sectional area between the first section and the second section.

10. The gas turbine engine of claim 1, comprising a support structure and a liner mounted on the support structure which forms the exterior surface of the splitter, wherein the one or more boreholes are formed in the liner.

11. The gas turbine engine of claim 10, wherein the liner is removably mounted on the support structure.

12. The gas turbine engine of claim 1, wherein:
    the bypass duct and the engine core are separated by a substantially annular casing; and
    the flow splitter is provided at the leading edge of the casing.

13. The gas turbine of claim 1, wherein the engine core comprises at least one compressor, a combustor, and at least one turbine.

14. The gas turbine engine of claim 1, wherein the one or more noise-attenuation boreholes includes both:
    a capped borehole that has a depth that is less than a thickness of the body such that that the capped borehole does not reach the internal cavity, and
    a through borehole that has a depth equal to the thickness of the body such that the through borehole extends from the external surface through the body and opens into the internal cavity.

* * * * *